July 16, 1968     W. D. KELIEHOR     3,392,947
THIN WALL TUBING FURNITURE STRUCTURE
Filed Oct. 19, 1965     2 Sheets-Sheet 1
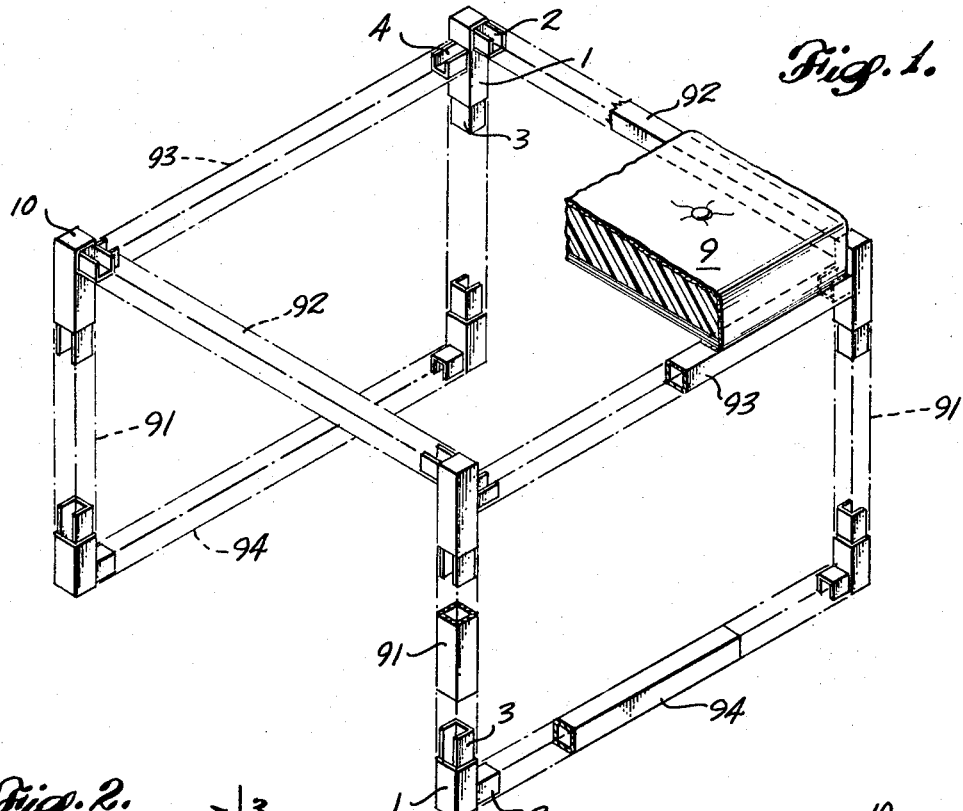
Fig. 1.
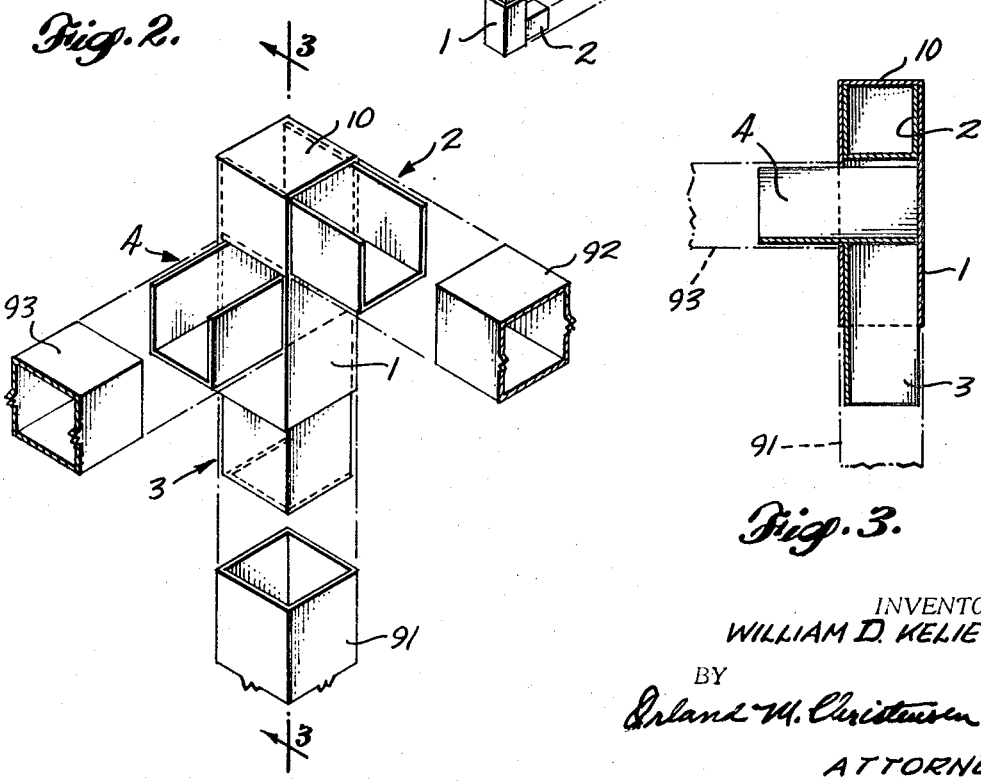
Fig. 2.
Fig. 3.
INVENTOR.
WILLIAM D. KELIEHOR
BY
Orland M. Christensen
ATTORNEY

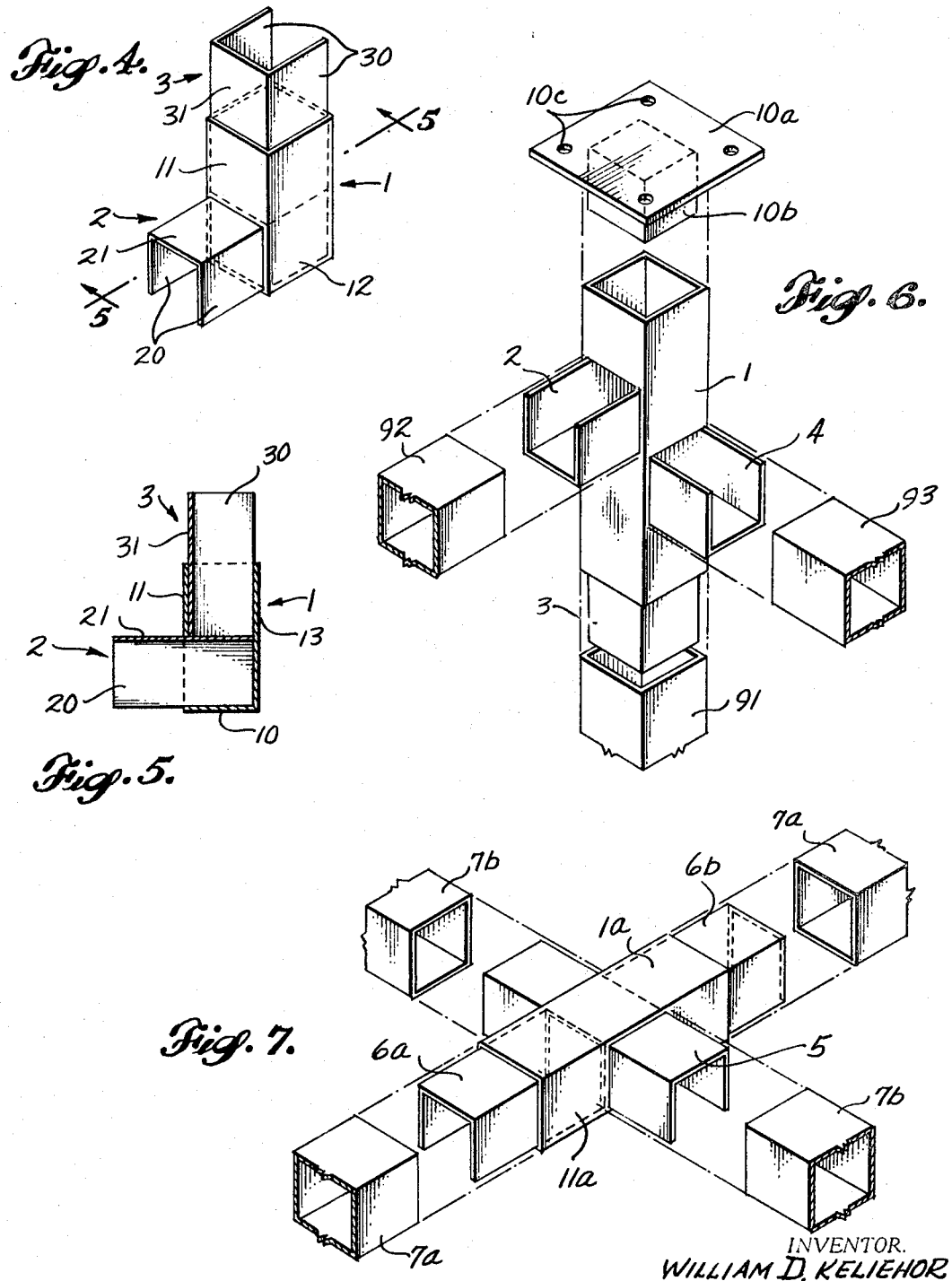

United States Patent Office 3,392,947
Patented July 16, 1968

3,392,947
THIN WALL TUBING FURNITURE STRUCTURE
William D. Keliehor, 11 Nishi Bayashi-cho, Shimogamo,
Sakyo-ku, Kyoto, Japan
Filed Oct. 19, 1965, Ser. No. 497,940
21 Claims. (Cl. 248—188.1)

ABSTRACT OF THE DISCLOSURE

A joint system for furniture utilizing flat sided tubing or channel frame members. Each joint is clean and all joining surfaces are flush since the tubing used for the joint housing is of the same size and shape as the tubing used for the frame members being joined. Flat sided stubs with outside dimensions approximately equal to the inside dimensions of the frame and housing tubes are inserted into and extend from the ends of and apertures formed in the straight joint housings. The other ends of the stubs are inserted into the ends of the frame members meeting at the joint.

This invention relates to joint structures and to frame constructions employing the same, and is herein illustrated in its application to an article of furniture, such as includes legs or uprights, and sets of upper and lower frame members interconnecting the legs. While the invention is herein illustratively described by reference to the presently preferred embodiment thereof, it will be recognized that certain variations and modifications thereof may be made without departing from the essential features involved. A stool has been chosen as a representative application for the invention, but the invention could be incorporated in a coffee table, or in an end table, or in more complex designs, whether for furniture or for other use to which it is adapted.

Such articles of furniture must support a load and be capable of resisting racking torques. This would normally require the use of tubing or other frame members that are thick-walled or heavy, if fabricated according to ordinary techniques. Desirably, such articles should be of light weight, however, and by the principles of this invention they can be made such by advantageous employment of thin-walled tubular material, brass for example, and yet by the use of joints which in themselves are a part of the invention, and by the manner of joining the frame members to these joints, according to the invention, the article can be made adequately strong and rugged, yet light in weight, and attractive at relatively low cost by employment of structural members any prefinish of which remains unmarred by the processes of fabrication into a completed structure.

Wherever joints are required in such thin-walled tubing members, the heat associated with welding or brazing tends to warp and distort them as well as to preclude use of prefinishes applied to the tubular members. Moreover, grinding and polishing of weld or braze seams is time consuming and expensive, and tends to dull any bright finish. According to the present invention joints in thin wall tubing structures are advantageously achieved without such difficulties by a novel technique involving cutting, interfitting and bonding with cold-set or low temperature materials applied to the frame members and joint stub components used therewith in the novel manner hereinafter described. While the invention is not limited to particular bonding agents, epoxy resin, or if preferred silver solder, are the presently preferred examples.

It is also an object hereof to devise improved joint structures employing thin wall tubular members, all exposed parts and surfaces being inconspicuously joined flush in contiguous relationship so as to afford an attractive structure which is easily and quickly assembled and in which, through a system of mutual abutment of parts and joined surfaces, the members serve to brace one another and avoid the need for external welds or brazing to achieve structural rigidity.

It is also an objective hereof to provide thin wall tubing structures the parts and fittings of which may be provided in assembly kit form, precut and prefinished, convenient for shipping and storage yet capable of being assembled readily and quickly, and if desired, permanently, although similar principles will apply if the structure be arranged to be knocked down after having been once assembled.

This invention comprises novel joint constructions for rectangular thin wall tubular articles, articles incorporating interconnected tubular members having such joint structures and the several individual joint structure embodiments comprising the presently preferred means for practicing the inventive concepts to achieve the above and related objects.

FIGURE 1 is primarily a phantom isometric view of the illustrative stool, illustrating in particular several of the joint structures of the invention.

FIGURE 2 is an isometric view of a joint structure according to the invention, for joining three frame members each at a right angle to the other two, and FIGURE 3 is a sectional view longitudinally of the same joint structure, at the line 3—3 of FIGURE 2.

FIGURE 4 is an isometric view of a joint structure according to the invention, for joining two frame members meeting at a right angle, and FIGURE 5 is a longitudinal section of the same, at the plane indicated by the line 5—5 of FIGURE 4.

FIGURE 6 is an isometric view, showing a variation of the joint structure of FIGURE 2.

FIGURE 7 is an isometric view of a joint structure used in cross-bracing the piece of furniture, wherever this is required.

In the illustrative stool shown in FIGURE 1 uprights or legs 91 are joined at their upper ends with rails 92, 93 that define a square or other form of rectangle, and are joined at their lower ends by horizontal floor-engaging bars 94. The form of the joints will be described below. The cushion 9, of any suitable form, rests upon the square 92, 93, and in particular in the form shown, upon the rails 93 of that square. The cushion could, of course, be so formed as to be supported also, or instead, by the rails 92, but as shown these rails 92, which lie in a plane somewhat above the rails 93, serve as stops to prevent lateral shifting of the cushion.

The simplest form of joint structure is that which joins two rectangularly related frame members, such as an upright 91 and a bar 94. This joint structure is shown in detail in FIGURES 4 and 5. It includes a sleeve or housing 1, of the same tubular material as the frame members—the same in cross section and in wall thickness, and normally of the same color and finish. If of polished brass, a thin, hard transparent plastic coating is usually applied as a prefinish to protect the lustre of the metal. This housing is closed at one end, as by a silver soldered or epoxy resin bonded end cap 10 of the same material, but is open at its opposite end. Immediately above the end cap 10 a side wall 11 is apertured, and a stub 2 of a cross section less than that of the tubular member 94 by the thickness of the opposite side walls of the latter, is received within such aperture, and projects laterally from the housing 1. The stub 2 can be, but it need not be, tubular, with four walls, but it is preferably channel-shaped, open at one side. Both the tubular member 94 and the stub 2 have flat sides, that contact one another. Thus, the stub has two opposite walls 20 which contact the inside of the opposite walls 12 of the housing 1, and it is of length that its squared inner end abuts the wall 13 opposite the aperture. Desirably, also, its lower margin, the edges of the channel as shown, engage the end cap 10. The contacting walls 20 and 12, or at least one of them, are joined permanently, as by silver soldering or by a strong adhesive such as epoxy resin. The ends of the stub's channel, where they abut the inside of wall 13, may be similarly joined, as may also the edges of the channel 2 and the end cap 10. To insure penetration of the joining agent between the walls, the entering portion of the stub 2 may be scored or striated; this has not been illustrated in order to avoid confusion.

Next a second stub 3, of like cross section as the stub 2, is fitted within the open end of the housing 1, and projects therefrom. It, too, is shown as of channel shape, and its walls 30 contact and are joined to the inside of walls 12 of the housing, and its wall 31 to the inside of wall 11. It is not strictly essential that all these walls be permanently joined, as long as one wall is so joined. The stub 3 is of a length that its squared end abuts the inner end face 21 of stub 2, and so reinforces the latter and locates it fixedly in position.

Now the upright tubular frame member 91 fits onto the stub 3, and its squared end lies flush against the end of housing 1. The bar 94 fits onto the stub 2, and its squared end lies flush with the side walls 11 and 12 of the housing. Parts can be secured in this relation in any suitable way. If they are to be disassembled later, bolts received within nuts affixed inside the stubs 2 and 3 may be used to join them. No such bolts and nuts are shown, because they can be joined permanently if this be required, such as with silver solder or epoxy resin or other low temperature bonding agent, application of which will not warp nor distort the prefinish of the members.

The joint structure of FIGURES 2 and 3 is similar to that of FIGURES 4 and 5, but is intended for use at the upper end of an upright 91. It provides a third stub 4 located longitudinally intermediate stubs 2 and 3, and extending at right angles to the plane defined by these two stubs, to receive a frame member such as 93, whereas at this location stub 3 fits upright 91 and stub 3 receives rail 92. The stub 4 is fixed within the housing 1 in the same manner as is stub 2. It is located just enough below the level of stub 2 that when frame members 93 and 92 are fitted to the respective stubs and their ends abut the housing 1, the upper surface of member 93 is flush with the lower surface of member 92, and the latter's upper surface is flush with end cap 10. Joining or abutting side surfaces of frame members 92 and 93 are flush with like surfaces of the housing 1. The result is a pleasing, unitary appearance.

FIGURE 6 illustrates a modification of the joint of FIGURES 2 and 3, in that the housing 1 extends above the level of frame member, and is closed at its upper end by a large end cap 10a, from which depends a stub 10b fitting within the open upper end of housing 1. The end cap 10a is provided with apertures 10c whereby the top 9 can be secured in place by screws or bolts.

A cross-bracing joint is shown in FIGURE 7. It would be used whenever the cushion or top 9 requires additional support centrally, or elsewhere between its sides. It includes a tubular housing 1a, apertured between its ends at two opposite side walls 11a. A stub 5 extends through the housing side walls 11a, and projects at each side of the housing 1a. Its upper wall, in the arrangements shown, contacts the inside of the upper wall of housing 1a, and can be fixed thereto in the manner already described. Stubs 6a and 6b enter the open ends of housing 1a, and abut the stub 5, bracing the latter. These stubs 6a and 6b are similarly fixed in place within the housing 1a. All these stubs, in the form shown, define a common plane. Matching stubs (not shown) are supported on the marginal frame members, in similar fashion, and tubular struts 7a and 7b are fitted onto such stubs and onto the stubs 6a, 6b, and 7a, 7b, respectively, and are secured thereto, flush with the housing 1a and with the frame members. This affords additional center support without change in the basic arrangement of the stool, and without great added weight.

It will be clear that the rectangular tubular members used might differ in cross section and still achieve flush joints using the invention, provided that they have one equal cross-sectional dimension. As in the usual connotation the term "rectangular" includes the case of a square as well as the general case. These and other aspects of the invention will be recognized by those skilled in the art referring to the within disclosure of the presently prefered embodiments.

I claim as my invention:

1. A framework for furniture or the like, comprising upright rectangular-section tubular frame members 91 and transverse tubular frame members 92 of like cross section extending in angular relation to one another, and a joint structure 1 at points where they meet including a straight tubular housing 1 of substantially the size and shape of said members, a first stub 3 received within an end of said housing 1, and of a size and shape and formed with at least two flat walls to contact flatwise respectively at least two flat inside walls of said housing 1, at least one such flat wall of the stub 3 being fixedly joined to the corresponding inside wall, and the stub being of a length to project from said housing 1 and to fit closely within an end of a first frame member 91, in contact with at least two inside walls thereof to extend the length of said frame member 91 by the length of said housing 1, said housing 1 having an aperture in its side wall for a further frame member 92 which it joins, to receive a further stub 2, such further stub 2 being of a size and shape defining at least two flat walls to contact two corresponding flat inside walls of the housing 1, and fixedly joined to at least one such inside wall, and of a length to project from the housing 1 and to fit closely within the end of said further frame member 92, in contact with at least two inside walls thereof.

2. A framework as defined in claim 1, wherein the stubs and the housing are complementally of a size and channel shape, the opposite side walls whereof contact flatwise the opposite housing, and are fixedly adhered at each such point of flatwise contact.

3. A framework as defined in claim 1, wherein the tubular frame members, the housing, and the stubs are all effectively of substantially square cross section.

4. A framework as defined in claim 1, wherein the housing of the joint structure at points where three frame members meet, has a second aperture in a side wall at right angles to the first-mentioned apertured wall, and offset lengthwise from the first aperture, and a further stub entering the second aperture and of a size and shape to define at least two flat walls, to contact flatwise the two corresponding respective flat inside walls of the housing, and fixedly joined to at least one such inside wall, and of a length to project from the housing and to fit closely within the end of a third frame member, in contact flatwise with at least two side walls thereof.

5. A framework as in claim 4, wherein the upper end of the housing is spaced above the upper frame member, and an end cap secured thereto and overlying and projecting outwardly of the housing, and formed for securement thereto of an overlying support.

6. A framework as in claim 1, wherein the end of each tubular frame member abuts and is flush with the corresponding portion of the housing.

7. A framework as defined in claim 1, including a cross-bracing structure joining two pairs of opposite parallel frame members that are disposed at right angles to one another, between their ends, said cross-bracing structure including a central crossing element and four struts joined thereto at their inner ends and joined at their outer ends to the respective parallel frame members by joint structures as defined in claim 1, the cross-bracing structure comprising a rectangular-section tubular housing apertured at its opposite sides between its ends, a stub extending through said opposite apertures and formed with two flat walls respectively contacting flatwise two corresponding flat inside walls of the housing, and joined to at least one such inside wall, said stub being of a size and shape to fit its projecting ends closely within the inner ends of two opposite struts, in contact with at least two inside walls of said struts, and a stub received within and projecting from the opposite ends of the housing and at their ends contacting the through stub, said last-mentioned stubs being of a size and shape to define at least two flat walls to contact the corresponding inside flat walls of the housing, at least one such stub wall being fixedly joined to its contacting housing wall, and of a size and shape to fit closely within the inner ends of the other two opposite struts, in contact with at least two inside walls thereof.

8. A joint structure for use in joining two rectangular-section tubular frame members of furniture or the like which meet at an angle, said joint structure comprising
   a straight tubular housing of a size and shape corresponding to the frame members that are to be joined,
   a first stub received within an end of said housing, and of a size and shape to define at least two flat walls to contact flatwise at least two flat inside walls of the housing, and fixedly joined to at least one such inside wall,
   said stub being of a length to project from the housing and to fit closely within an end of one of the frame members to be joined, in contact flatwise with at least two flat walls thereof to extend the length of said frame member by the length of said housing,
   said housing having an aperture in a side wall to receive a second laterally directed stub,
   said second stub being of a size and shape to contact flatwise at least two flat inside walls of the housing, and fixedly joined to at least one such inside wall, and
   said second stub being of a length to project laterally from the housing and to fit closely within the end of and in contact flatwise with at least two flat walls of a second of the frame members to be joined.

9. A joint structure as defined in claim 8, including a closure fitted to and joined to the end of the housing opposite the first stub, the second stub contacting and braced by said end closure, and the first stub's end engaging and bracing said second stub.

10. A joint structure for use in joining three rectangular-section tubular members of furniture or the like, two of which meet substantially at a right angle and a third of which meets substantially at a right angle to the plane defined by the first two, said joint structure being adapted for inner position between and junctured to the three frame members, and comprising
   a straight rectangular-section tubular housing of a size and shape corresponding to the frame members that are to be joined,
   a first stub received within an end of said housing and of a size and shape to define at least two flat walls in flatwise contact with the corresponding two inside walls of the housing, and fixedly joined to at least one of such flat inside walls,
   said first stub being of a length to project from the housing and to fit closely within an end of a first frame member, in flatwise contact with at least two flat inside walls thereof to extend the length of said frame member by the length of said housing,
   said housing having an aperture in one such wall to receive a second stub,
   said second stub being of a size and shape to contact flatwise at least two flat inside walls of the housing, and fixedly joined to at least one such inside wall, and of a length to project laterally from the housing and to fit closely within the end of a second frame member, in flatwise contact with the corresponding two flat inside walls thereof,
   said housing having a further aperture in a different side wall, offset lengthwise from its first-mentioned aperture, to receive a third stub,
   said third stub being of a size and shape to contact flatwise at least two flat inside walls of the housing, and fixedly joined to at least one of such inside walls, and of a length to fit closely within the end of the third frame member, in flatwise contact with the corresponding two flat inside walls thereof.

11. A joint structure as in claim 10, wherein
   the end of the housing is spaced above the upper frame member, and
   an end cap secured within such upper end of the housing and projecting marginally outwardly thereof,
   said projecting marginal portion being formed for securement thereto of an overlying support.

12. A cross-bracing structure for use in cross-bracing a tubular framework such as includes two pairs of opposite parallel frame members that are disposed at right angles to one another, said cross-bracing structure comprising
   a central crossing element and four struts for joining to the parallel frame members at their outer ends and joined to the crossing element at their inner ends,
   said central crossing element comprising a straight rectangular-section tubular housing of a size and shape corresponding to said frame members apertured at its opposite sides between its ends,
   a stub extending through and projecting from said apertures and formed with at least one flat wall fixedly adhered to at least one flat inside wall of the housing, and of a size and shape to fit closely within the inner ends of two opposite struts, in flatwise contact with at least two flat walls thereof, and
   a stub received within and projecting from the opposite ends of the housing, and each at its inner end contacting the through strut, and of a size and shape to fit closely within the inner ends of the other two struts, and also to define at least two flat walls to contact flatwise respectively at least the corresponding flat inside walls of the housing, and at least one stub wall being fixedly adhered to the corresponding housing wall.

13. A joint structure for use in joining two tubular frame members of rectangular cross section, for furniture or the like, and which meet at an angle, said joint structure comprising
   a straight rectangular housing of a size and shape corresponding to the frame members that are to be joined,
   a stub received within the side wall at an end of said housing, of a size and shape to contact at least two flat inside walls thereof, and fixedly adhered to at least one such inside wall,
   one wall of said housing being apertured for entrance of the stub and the stub being of a length to project laterally from the housing and to fit closely within and at least against two flat side walls of an end of one of the frame members to be joined, and
   a second stub of a shape and size to fit within the end of said housing, in contact with at least two flat inside walls thereof, and fixedly adhered to at least one such inside wall,
   said second stub being of a length to project from the end of the housing and to fit closely within and against at least two flat side walls of the end of a second of the frame members to be joined to extend the length of said frame member by the length of said housing.

14. A joint structure as defined in and for the purpose specified in claim 13, wherein the inner end of the second stub contacts the outer wall of the first stub.

15. A joint structure as in claim 13, wherein the inner end of the first stub contacts the inner wall of the housing, opposite the latter's aperture.

16. A framework for furniture or the like, comprising upright tubular frame members of rectangular cross section, and like transverse tubular frame members arranged in rectangular relation, a joint structure at each point where two or more such frame members meet, said joint structure in its form where three frame members meet comprising a housing of a cross section corresponding to that of the frame members, a stub directly laterally in one direction from the end of said housing, the latter's wall being apertured to receive said stub, and the stub being of a size and shape to contact flatwise at least two inside walls of the housing, and joined to a least one such inside wall, and also of a size and shape to contact endwise at least two inside walls of the housing opposite its aperture, said stub also being of a size and shape to engage closely within at least two walls inside the end of another frame member, a further stub offset lengthwise of the housing from the first stub, and similarly engaged with and projecting from a second apertured wall of the housing, and similarly engaged within the end of a different frame member, and a third stub received within and projecting from an end of the housing, and at its end abutting one of the other stubs, and joined to a side wall of the housing, said third stub being of a size and shape fitting closely within the end of a still further frame member, in engagement with at least two flat inside walls thereof.

17. An article of furniture as in claim 16, including a cross-bracing structure interconnecting the two members of each of the two opposite pairs thereof, between their ends, said cross-bracing structure including a central tubular element of rectangular cross section having four stubs projecting laterally towards each of the paired frame members, complimental stubs projecting laterally from each such frame member towards the corresponding central stub, and four tubular struts of rectagular cross section fitting closely about and contacting two flat walls of each of the two corresponding stubs, and abutting at its ends the frame member and the central element.

18. A framework for furniture or the like, comprising upright tubular frame members of rectangular cross section, and like substantially horizontal tubular frame members arranged in rectangular relation, a joint structure at each point where two or more such frame members meet, said joint structure in its form where only two frame members meet comprising a straight tubular housing of a cross section size and shape corresponding to that of the frame members, a stub directed laterally in one direction from the end of said housing, the latter being apertured to receive closely said stub, and the stub being of a size and shape to contact flatwise at least two inside walls of the housing, and joined to at least one such inside wall, and to contact endwise the inside wall of the housing opposite its aperture, said stub being also of a size and shape engaging closely within at least two walls inside the end of one frame member, and a second stub received within and projecting from an end of the housing, and at its end abutting the first stub, and joined to a side wall of the housing, said second stub being of a size and shape fitting closely within the end of the second frace member, in engagement with at least two inside flat walls thereof to extend the length of said second frame member by the length of said housing.

19. A framework for furniture or the like, comprising: four tubular frame members effectively of rectangular cross section, two of said members in use are disposed in parallelism in a common plane, and the other two in parallelism transverse to the first two in a common plane offset from the plane of the first two, and a joint structure at points where said frame members intersect including a tubular housing of substantially the size and shape of said frame members, which in use is disposed perpendicularly to and intersects the planes defined by said frame members, said housing having an aperture in at least two relatively angularly disposed side walls thereof, each aperture of a size and shape to receive a stub, said apertures being offset lengthwise of said housing in correspondence with the offset of said planes defined by the respective frame members, and stub means received within each aperture, each stub being of a size and shape forming at least two flat exterior walls to contact two corresponding flat inside walls of said housing, and fixedly joined to at least one such inside wall, and of a length to project from said housing and to fit closely within the end of the corresponding frame members, such frame member ends contacting and lying flush with the side walls of said housing.

20. A joint structure for use in joining two rectangular-section frame members or the like which meet substantially at right angles to one another, said joint structure comprising:
a tubular housing of a size and shape corresponding to the frame members that are to be joined,
said housing having an aperture in a side wall of a size and shape to receive a first stub that extends laterally beyond such side wall to fit within the end of a frame member,
a second aperture in a side wall of said housing angularly related to said first-mentioned side wall,
said second aperture of a size and shape to receive a second stub similarly extending laterally at an angle to said first stub to fit within the end of a second frame member,
said two apertures being offset relatively lengthwise of said housing such that the stubs when thus received into said housing contact one another and are thereby braced one from the other.

21. A joint structure as in claim 20, including:
an end closure fitted to and joined within the end of said housing,
said end closure being of a length to contact and brace the stub which is nearer to such housing end, and through that stub to brace the other stub.

References Cited

UNITED STATES PATENTS 2,546,187  3/1951  Harward _____ 287—189.36

FOREIGN PATENTS 793,017  11/1935  France.
252,490  10/1948  Sweden.

CHANCELLOR E. HARRIS, *Primary Examiner.*